E. H. SIMONS & R. KLEIN.
YIELDING COUPLING.
APPLICATION FILED SEPT. 29, 1913.
1,168,121.
Patented Jan. 11, 1916.
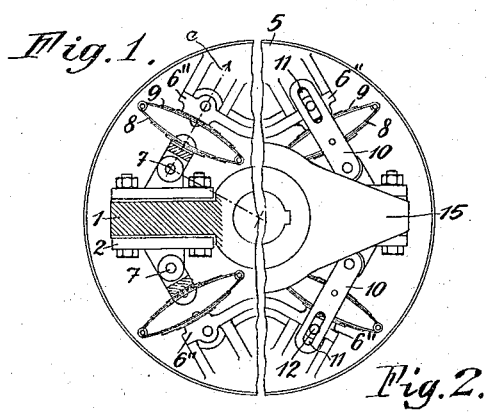
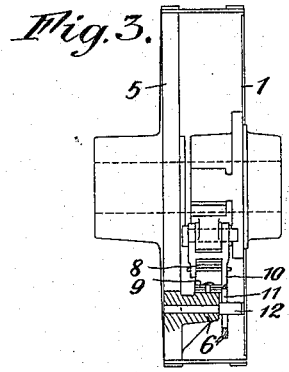
WITNESSES
W. C. Baker Jr.
Geo. L. Belle
INVENTORS
ELDERT HERMANUS SIMONS
RUDOLF KLEIN
BY Munn & Co
ATTORNEYS

UNITED STATES PATENT OFFICE.

ELDERT HERMANUS SIMONS AND RUDOLF KLEIN, OF WEINHEIM, GERMANY, ASSIGNORS TO MASCHINENFABRIK BADENIA, VORM. WM. PLATZ SÖHNE A.-G., OF WEINHEIM, GERMANY, A FIRM.

YIELDING COUPLING.

1,168,121.  Specification of Letters Patent.  Patented Jan. 11, 1916.

Application filed September 29, 1913. Serial No. 792,339.

*To all whom it may concern:*

Be it known that we, ELDERT HERMANUS SIMONS, a citizen of the Kingdom of the Netherlands, and resident of the city of Weinheim, in the German Empire, and RUDOLF KLEIN, a citizen of the Empire of Austria-Hungary, and resident of the city of Weinheim, in the German Empire, have invented new and useful Improvements in Yielding Couplings, of which the following is a specification.

The present invention relates to an improvement in resilient couplings wherein the power transmission is obtained by means of blade springs, the latter being connected to one coupling member and bearing upon the faces of the other coupling member. In known constructions of couplings of this kind the blade springs bear upon the driven face of a coupling member not at right angles to the direction of the peripheral force, and possess the drawbacks that the springs are influenced by lateral forces which result in rapid wear and even fracture of the coupling. These couplings are therefore not suitable for transmitting high power. The present invention eliminates this drawback by arranging the blade springs so that they are at right angles to the tangential peripheral force acting at their point of articulation on the coupling member. The lateral forces which do not act normally upon the springs, have their action eliminated or wholly avoided so that the wear and the danger of fracture are diminished as far as possible. To eliminate the wear which takes place owing to the sliding of the spring ends on the driven face of the driven coupling member bringing the springs into action the coupling springs are formed, in accordance with the invention as twin blade springs and connected on both sides to the coupling members.

In the accompanying drawing two embodiments of the invention are shown.

Figures 1 and 2 show said two constructions of the coupling in end elevation. Fig. 3 is a side elevation of the coupling shown in Fig. 2 partly in section.

In the embodiment shown in Fig. 1 of the drawing we use twin blade springs 8 and 9 which are connected to each other at their extremities. One part 8 of the springs is pivotally connected to the point 7 on the driving faces 1 of one coupling member or on the bearing plates 2 secured thereto while the other part 9 of the spring is connected to the drivers 6″ of the coupling member 5. As is to be seen in Fig. 1 the springs 8 and 9 and also the driving faces 6″ of the clutch members 5 are arranged at right angles to the resultant forces *c* acting tangentially on the pivotal points 7 of the springs 8 on the other clutch member. Lateral forces acting upon the springs 8 and 9 cannot be created in this construction so that the springs are normally influenced. The driving ribs 1 in the construction shown in Fig. 1, are connected with the nave or hub of its coupling member and in view of the additional resiliency provided by the yield of the twin springs upon themselves, shorter springs can be employed and the diameter of the coupling made correspondingly smaller without depreciating from the total resiliency of the coupling. In view of the stated advantages, the coupling shown in Fig 1 is especially adapted for transmitting high power.

In the modification shown in Fig. 2 the link plates 10 of the spring carriers are extended as shown also in Fig. 3 behind the part 9 of the twin spring, and formed at the end with a slot 11 by means of which the said link plates are guided by the pins 12 of the other coupling member 5. The pins 12 are preferably arranged on the sides of the driving ribs 6″ of the coupling member 5. Such guiding means may also be provided in the construction shown in Fig. 1.

We claim:

1. In a yielding coupling a driving and a driven member, a spring member consisting of twin blade springs connected at the ends and arranged on the one coupling member for the direct transmission of the power and means for eliminating the lateral forces created in the blade springs.

2. In a yielding coupling a driving and a driven member, a spring member consisting of twin blade springs, connected at the ends and arranged on the one coupling member for the direct transmission of the power and means for guiding the spring in order to eliminate the lateral forces created in the blade springs.

3. In a yielding coupling, a driving and a driven member, a spring consisting of two blades connected at their ends and attached to one coupling member for direct transmission of power to the other member, and means for eliminating lateral forces created in the blades of the springs.

4. In a yielding coupling, a driving and a driven member, a spring member consisting of twin blade springs connected at their ends and attached to one coupling member for transmitting power directly to the other member, and slotted means for guiding said spring to eliminate the lateral forces created in the said blade springs.

In testimony whereof we have signed our names to this specification in the presence of two subscribing witnesses.

ELDERT HERMANUS SIMONS. [L. S.]
RUDOLF KLEIN. [L. S.]

Witnesses:
JOSEPH PFEIFFER,
ELISE SELBERGER.

Copies of this patent may be obtained for five cents each, by addressing the "Commissioner of Patents, Washington, D. C."